(12) United States Patent
Kim et al.

(10) Patent No.: US 8,734,978 B2
(45) Date of Patent: May 27, 2014

(54) BATTERY PACK

(75) Inventors: Myung-Chul Kim, Yongin-si (KR); Hyun-Ye Lee, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 398 days.

(21) Appl. No.: 12/814,372

(22) Filed: Jun. 11, 2010

(65) Prior Publication Data
US 2011/0104552 A1    May 5, 2011

Related U.S. Application Data

(60) Provisional application No. 61/258,558, filed on Nov. 5, 2009.

(51) Int. Cl.
*H01M 6/42* (2006.01)
(52) U.S. Cl.
USPC ........................................................ 429/151
(58) Field of Classification Search
CPC ............ H01M 6/42; H01M 6/46; H01M 2/24
USPC .................. 429/149–160, 163–187
See application file for complete search history.

(56) References Cited

U.S. PATENT DOCUMENTS

| | | | |
|---|---|---|---|
| 5,766,801 A | 6/1998 | Inoue et al. | |
| 6,312,851 B1 * | 11/2001 | Fukuda et al. | 429/176 |
| 2003/0211384 A1 | 11/2003 | Hamada et al. | |
| 2005/0058891 A1 * | 3/2005 | Marraffa | 429/99 |
| 2005/0084748 A1 | 4/2005 | Miller et al. | |
| 2007/0037051 A1 * | 2/2007 | Kim et al. | 429/151 |
| 2007/0052390 A1 * | 3/2007 | Kim et al. | 320/116 |
| 2007/0133151 A1 * | 6/2007 | Jeon et al. | 361/600 |
| 2008/0124622 A1 | 5/2008 | Hamada et al. | |
| 2009/0263705 A1 * | 10/2009 | Anantharaman | 429/61 |
| 2009/0269657 A1 * | 10/2009 | Mita et al. | 429/151 |
| 2011/0135992 A1 | 6/2011 | Kim et al. | |

FOREIGN PATENT DOCUMENTS

| | | |
|---|---|---|
| JP | 08-303682 | 11/1996 |
| JP | 09-120808 | 5/1997 |
| JP | 11-121024 | 4/1999 |
| JP | 2003-157817 | 5/2003 |

(Continued)

OTHER PUBLICATIONS

European Search Report dated Mar. 11, 2011, for European Patent application 10189920.1.

(Continued)

*Primary Examiner* — Patrick Ryan
*Assistant Examiner* — Kiran Quraishi
(74) *Attorney, Agent, or Firm* — Christie, Parker & Hale, LLP

(57) ABSTRACT

A battery module includes a first end plate and a second end plate, each of the end plates including at least one flange; a plurality of battery units arranged along a first direction between the end plates; a first guide plate on a first side of the plurality of battery units, extending in the first direction and coupled to the flanges of the first and second end plates; and a second guide plate on a second side of the plurality of battery units opposite the first side, extending in the first direction and coupled to the flanges of the first and second end plates.

6 Claims, 6 Drawing Sheets

(56) References Cited

FOREIGN PATENT DOCUMENTS

| | | | |
|---|---|---|---|
| JP | 2004-047426 | 2/2004 | |
| JP | 2004-103489 | 4/2004 | |
| JP | 2008-282625 | 11/2008 | |
| JP | 2011-119222 | 6/2011 | |
| KR | 1020070025734 A * | 3/2007 | ............. H01M 2/10 |
| KR | 1020070101025 A | 10/2007 | |
| KR | 1020080034625 A | 4/2008 | |
| WO | WO 2006/087962 A1 | 8/2006 | |
| WO | WO2008/035872 * | 3/2008 | ............. H01M 2/10 |
| WO | WO 2008/035872 A1 * | 3/2008 | ............. H01M 2/10 |
| WO | WO2008/035872 A1 * | 3/2008 | ............. H01M 2/10 |
| WO | WO 2008/035873 A1 | 3/2008 | |

OTHER PUBLICATIONS

KIPO Office Action dated Oct. 7, 2011 for KR Application No. 10-2010-0077493 (3 pages).

Japanese Office action dated Dec. 18, 2012, for corresponding Japanese Patent application 2010-243590, (5 pages).

Patent Abstracts of Japan, and English machine translation of Japanese Publication 08-303682 listed above, (9 pages).

Patent Abstracts of Japan, and English machine translation of Japanese Publication 2003-157817 listed above, (14 pages).

Patent Abstracts of Japan, and English machine translation of Japanese Publication 2004-103489 listed above, (21 pages).

Patent Abstracts of Japan, and English machine translation of Japanese Publication 2008-282625 listed above, (23 pages).

* cited by examiner

BATTERY PACK

CROSS-REFERENCE TO RELATED APPLICATION

This application claims priority to and the benefit of U.S. Provisional Application No. 61/258,558, filed on Nov. 5, 2009, in the United States Patent and Trademark Office, the entire content of which is incorporated herein by reference.

BACKGROUND

1. Field

One or more embodiments of the present invention relate to a battery pack in which a plurality of stacked battery modules are connected to each other.

2. Description of the Related Art

In general, unlike primary batteries that are not intended to be rechargeable, secondary batteries are rechargeable and dischargeable. Secondary batteries are used as energy sources for mobile devices, electric vehicles, hybrid electric vehicles, electric bicycles, uninterruptible power supplies, etc.

Small devices, such as the mobile devices, use a small number of battery cells. On the other hand, medium or large devices, such as electric vehicles and hybrid electric vehicles, require high power and large capacity, and thus use a battery pack in which a plurality of battery cells are electrically connected to each other.

A plurality of battery cells are generally connected in series or in parallel so as to be included in a battery unit. A plurality of battery units are connected to form a battery module. A plurality of battery modules are connected to form a battery pack in order to provide higher power and larger capacity.

SUMMARY OF THE INVENTION

An aspect of an embodiment of the present invention is directed toward a battery pack formed of a plurality of stacked battery modules connected to each other.

An embodiment of the present invention provides a battery module including a first end plate and a second end plate, each of the end plates including at least one flange; a plurality of battery units arranged along a first direction between the end plates; a first guide plate on a first side of the plurality of battery units, extending in the first direction and coupled to the flanges of the first and second end plates; and a second guide plate on a second side of the plurality of battery units opposite the first side, extending in the first direction and coupled to the flanges of the first and second end plates.

A distance between the first and second guide plates in a second direction perpendicular to the first direction may be greater than or equal to a width in the second direction of the end plates.

The battery module may further include: a first reinforcement plate on a third side of the plurality of battery units, extending in the first direction and coupled to the first and second end plates; and a second reinforcement plate on a fourth side of the plurality of battery units opposite the third side, extending in the first direction and coupled to the first and second end plates.

The first reinforcement plate may include a first contact plate on the third side of the plurality of battery units and first bent portions on each side of the first contact plate extending away from the plurality of battery units, and the second reinforcement plate may include a second contact plate on the fourth side of the plurality of battery units and second bent portions on each side of the second contact plate extending away from the plurality of battery units.

Each of the end plates may further include a base plate adjacent to the plurality of battery units, wherein the at least one flange may include: first and second flanges extending respectively from the first and second sides of the base plate away from the plurality of battery units; a third flange extending from a third side of the base plate away from the plurality of battery units; and a fourth flange extending from a fourth side of the base plate away from the plurality of battery units, the fourth side being opposite to the third side.

Each of the flanges may have openings.

The battery module may further include: a first reinforcement plate on a third side of the plurality of battery units extending in the first direction and coupled to the first and second end plates; and a second reinforcement plate on a fourth side of the plurality of battery units opposite the third side, extending in the first direction and coupled to the first and second end plates, wherein the first reinforcement plate attaches to the third flange and the second reinforcement plate attaches to the fourth flange.

The battery module may further include a first insulation plate between the first reinforcement plate and the third side of the plurality of battery units; and a second insulation plate between the second reinforcement plate and the fourth side of the plurality of battery units.

The third flange may include a low portion having a lower height than other portions of the third side of the base plate, and wherein the low portion receives the first reinforcement plate.

The first and second guide plates may have openings.

Another embodiment of the present invention provides a battery pack including a plurality of battery modules, each of the plurality of battery modules including: a first end plate and a second end plate, each of the end plates including at least one flange; a plurality of battery units arranged along a first direction between the end plates; a first guide plate on a first side of the plurality of battery units, extending in the first direction and coupled to the flanges of the first and second end plates; and a second guide plate on a second side of the plurality of battery units opposite the first side, extending in the first direction and coupled to the flanges of the first and second end plates.

The plurality of battery modules may be adjacent one another in at least one of the second direction or a third direction perpendicular to the first and second directions.

Each of the plurality of battery modules may further include: a first reinforcement plate on a third side of the plurality of battery units, extending in the first direction and coupled to the first and second end plates; and a second reinforcement plate on a fourth side of the plurality of battery units opposite to the third side, extending in the first direction and coupled to the first and second end plates.

When the battery modules are adjacent one another in a third direction perpendicular to the first and second directions, the first reinforcement plate of one of the battery modules and the second reinforcement plate of another one of the battery modules may form a gas discharge opening.

The first reinforcement plate may include a first contact plate on the third side of the plurality of battery units and first bent portions on each side of the first contact plate extending away from the plurality of battery units, and the second reinforcement plate may include a second contact plate on the fourth side of the plurality of battery units and second bent portions on each side of the second contact plate extending away from the plurality of battery units.

Each of the end plates may further include a base plate adjacent to the plurality of battery units, wherein the at least one flange may include: first and second flanges extending respectively from the first and second sides of the base plate away from the plurality of battery units; a third flange extending from a third side of the base plate away from the plurality of battery units; and a fourth flange extending from a fourth side of the base plate away from the plurality of battery units, the fourth side being opposite to the third side.

At least a portion of the at least one flange of one of the end plates of one of the battery modules may contact at least a portion of the at least one flange of one of the end plates of an adjacent one of the battery modules in at least one of the second direction or a third direction perpendicular to the first and second directions.

Each of the end plates may have openings, and the first end plates of adjacent ones of the battery modules may be attached to each other with fasteners through respective ones of the openings and the second end plates of adjacent ones of the battery modules may be attached to each other with fasteners through respective ones of the openings.

The flanges of the first end plates of adjacent ones of the battery modules may be welded together and the flanges of the second end plates of adjacent ones of the battery modules may be welded together.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
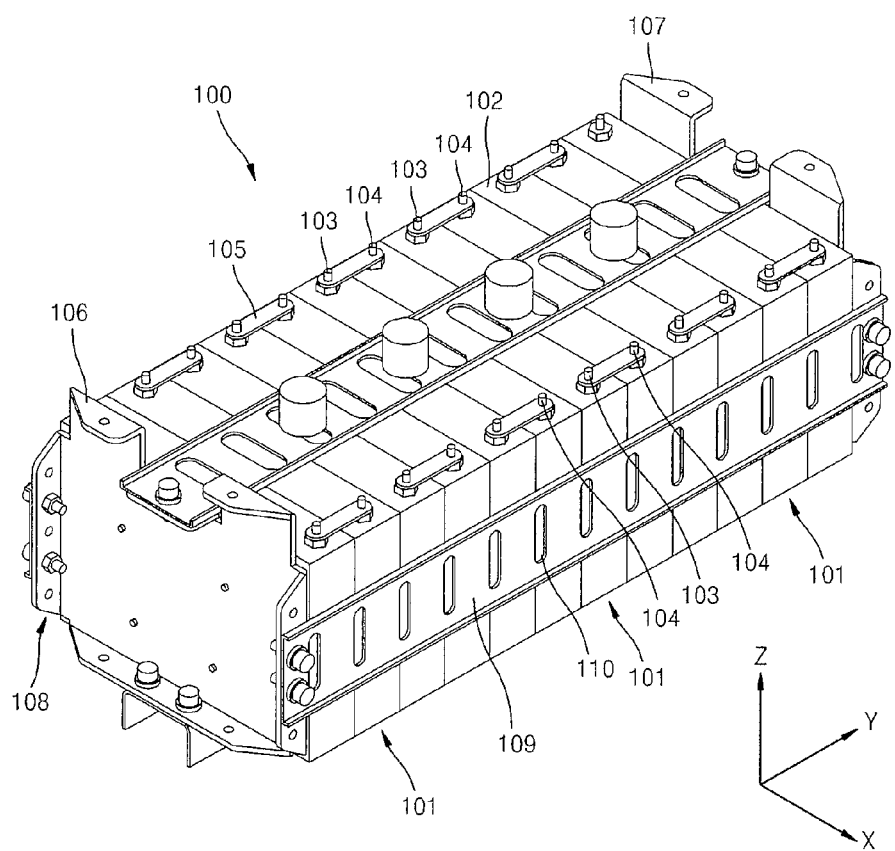
FIG. 1 is a perspective view of a battery module, according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When a battery pack is assembled by using a plurality of battery modules, the battery modules should be firmly connected to each other so as to achieve a stable structure for the battery pack.

FIG. 1 is a perspective view of a battery module 100, according to an embodiment of the present invention.

Referring to FIG. 1, the battery module 100 includes a plurality of battery units 101. The battery units 101 are sequentially arranged along a horizontal direction (Y direction). Alternatively, the battery units 101 may be sequentially arranged along a vertical direction (Z direction). The structure of the battery units 101 is not limited to any one structure as long as the battery units 101 are stacked in one or more directions.

Although not shown in FIG. 1, a plurality of battery cells are stacked in each battery unit 101 and are contained in a case 102.

A secondary battery, such as a conventional lithium secondary battery, may be used as a battery cell. For example, the battery cell may be a cylindrical secondary battery, an angular secondary battery, or a polymer secondary battery, and is not limited to any one type of secondary battery. The battery cells are electrically connected by using positive and negative electrode tabs that are, respectively, electrically connected to positive and negative terminals 103 and 104 that protrude from the case 102. For example, the battery cells may be connected in parallel, in series, or in parallel and series, and the connection method of the battery cells is not limited to any one connection method.

The battery units 101 are arranged so that polarities of neighboring battery units 101 are opposite to each other. The positive terminal 103 of one battery unit 101 is connected to the negative terminal 104 of a neighboring battery unit 101 by using a bus bar 105.

As such, the battery units 101 are sequentially connected to form one battery module 100. The number of battery units 101 may be determined by considering charge and discharge capacities required to design the battery module 100.

A pair of end plates 108 are separately mounted at outermost sides of the battery module 100. The end plates 108 include a first end plate 106 mounted at one end of the battery module 100 and a second end plate 107 mounted at the other end of the battery module 100.

One surface of the first end plate 106 and one surface of the second end plate 107 separately contact outer surfaces of the battery units 101 arranged at the outermost sides of the battery module 100.

The first and second end plates 106 and 107 are combined by using guide plates 109. The guide plates 109 extend along side walls of the battery units 101. Each of the guide plates 109 is a strip-type plate of which one end is attached to (e.g., screw-combined with) the first end plate 106 and the other end is attached to (e.g., screw-combined with) the second end plate 107. As such, the battery units 101 are fixed in (e.g., may not be moved from) their sequentially arranged positions in the horizontal direction, unless the battery module 100 is disassembled.

Heat radiating holes 110 are formed in the guide plates 109. The heat radiating holes 110 are arranged at uniform intervals along a length direction of the guide plates 109. The heat radiating holes 110 are formed to rapidly radiate to the outside heat generated from the battery units 101 during operation.

Figure 2:
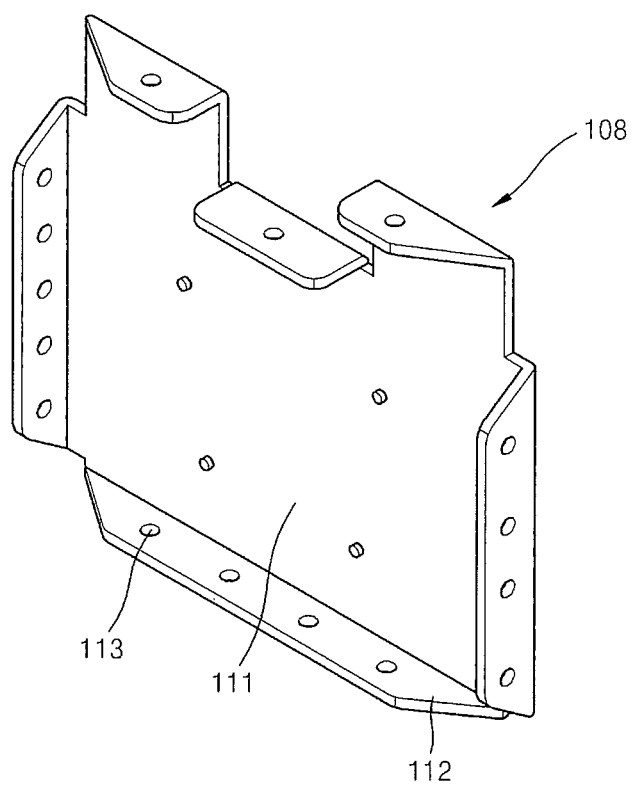
FIG. 2 is a perspective view of an end plate of the battery module illustrated in FIG. 1, according to an embodiment of the present invention.

FIG. 2 is a perspective view of an end plate 108 illustrated in FIG. 1, according to an embodiment of the present invention.

Referring to FIG. 2, the end plate 108 includes a base plate 111 and a flange unit 112 bent from the base plate 111. The base plate 111 has a size that is sufficient to cover an outer surface of the battery units 101 illustrated in FIG. 1. Although the base plate 111 has a generally rectangular shape in FIG. 2, the shape of the base plate 111 is not limited thereto.

The flange unit 112 is bent from edges of the base plate 111 in a direction opposite to the direction in which the battery units 101 are arranged. The flange unit 112 may be bent in various formations, according to a combination method with other elements. For example, the flange unit 112 may have one bent portion from the base plate 111 without a cut at each of left, right, and bottom edges of the base plate 111, and may have a plurality of bent portions having different heights by cutting a portion of the base plate 111 at a top edge of the base plate 111.

Further, a plurality of combination holes 113 are formed in the flange unit 112.

Figure 3:
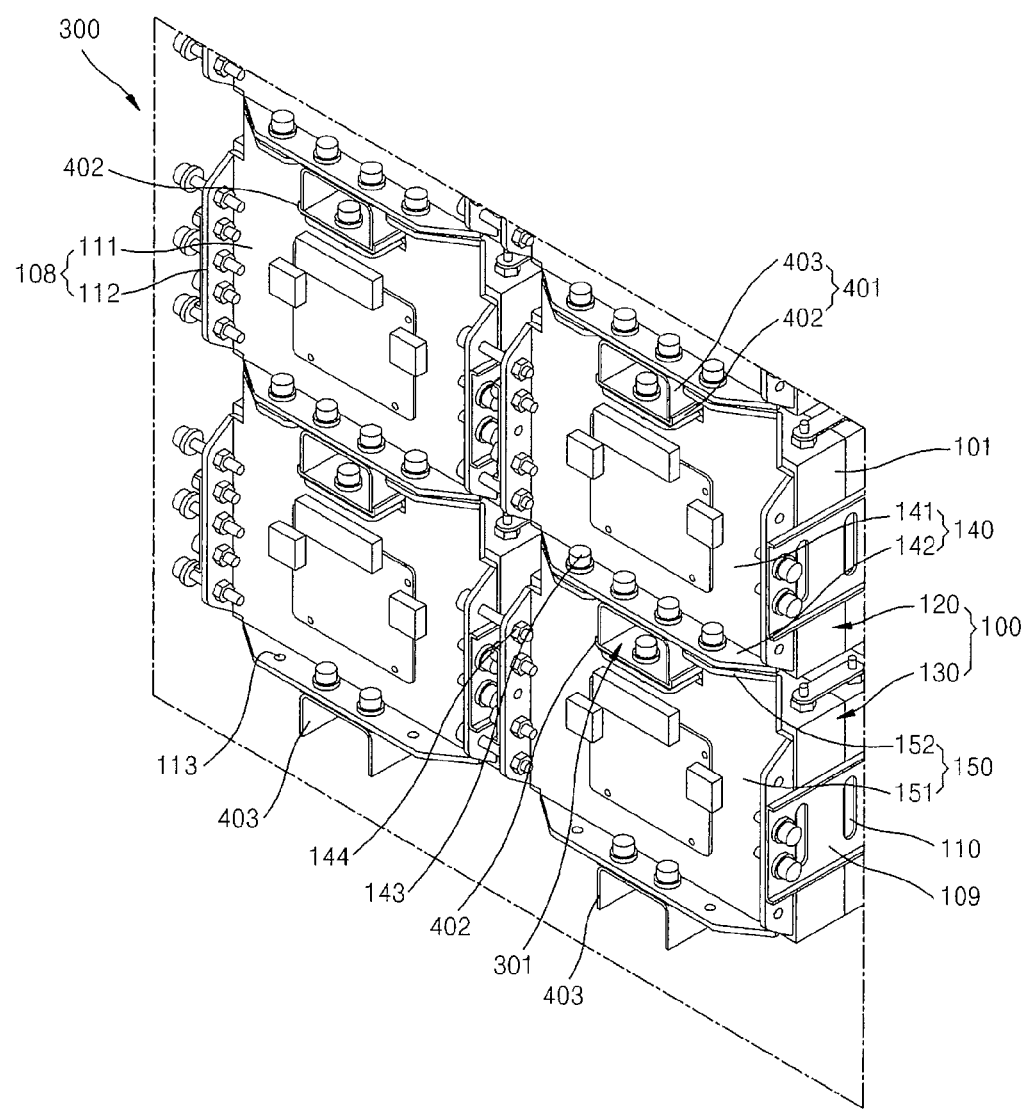
FIG. 3 is a magnified perspective view of a plurality of end plates, as illustrated in FIG. 1, when the end plates are connected, according to an embodiment of the present invention.
Figure 6:
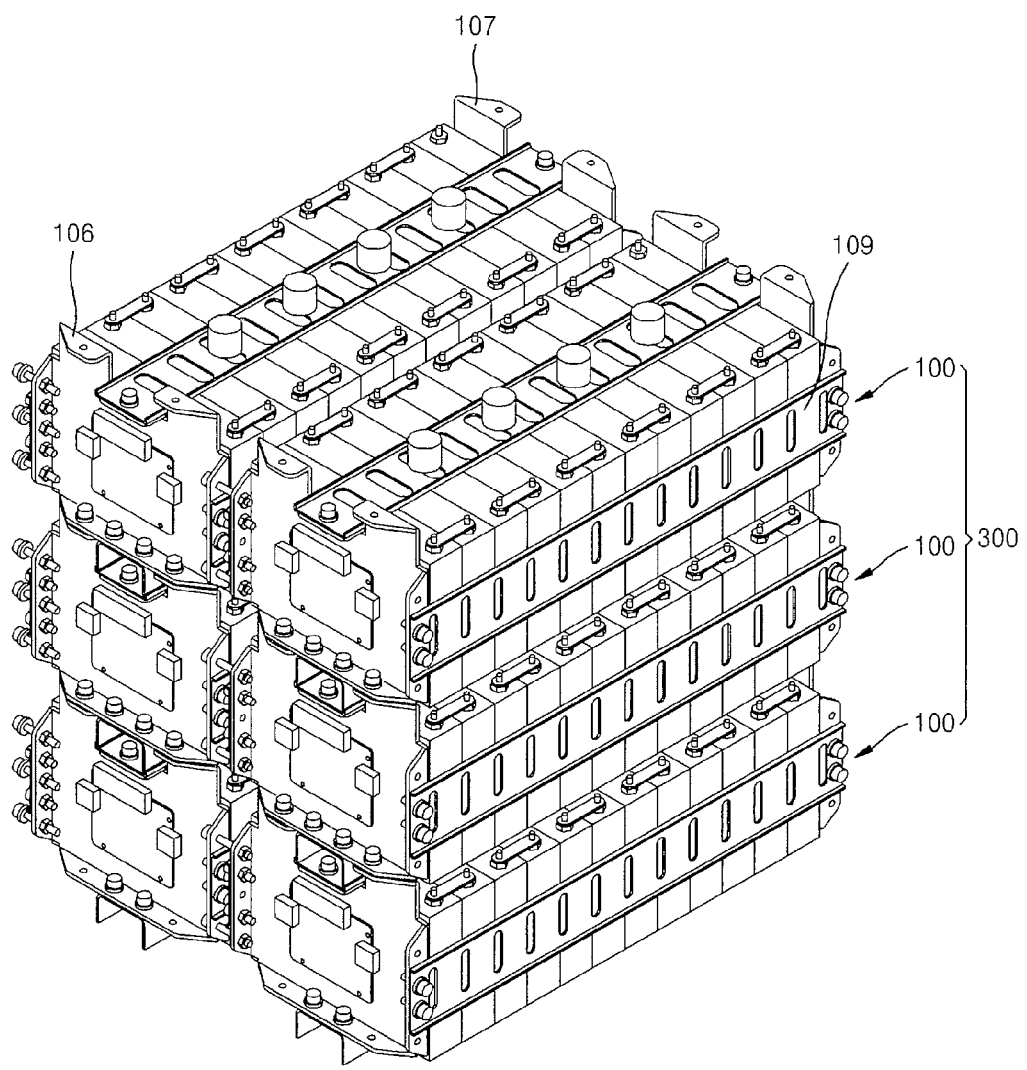
FIG. 6 is a perspective view of a battery pack in which a plurality of battery modules illustrated in FIG. 1 are stacked, according to an embodiment of the present invention.

FIG. 3 is a magnified perspective view of a plurality of end plates 108 illustrated in FIG. 1 when the end plates 108 are connected, according to an embodiment of the present invention. FIG. 6 is a perspective view of a battery pack 300 in which a plurality of battery modules 100 illustrated in FIG. 1 are stacked, according to an embodiment of the present invention.

In FIG. 3, the end plates 108 are substantially identical to upper and lower end plates 140 and 150 to be described later, as well as the first and second end plates 106 and 107 illustrated in FIG. 1.

Referring to FIGS. 3 and 6, the battery pack 300 is an assembly of the battery modules 100 stacked in horizontal and vertical directions. The number of battery modules 100 may be determined by considering the charge and discharge capacities required to design the battery pack 300.

In this case, the battery modules 100 stacked in the horizontal and vertical directions are connected to each other. As described above in relation to FIG. 1, a pair of end plates 108 are separately mounted at outermost ends of every battery module 100. Neighboring battery modules 100 are combined by connecting to each other the end plates 108 mounted at the outermost ends of the battery modules 100.

For example, an upper battery module 120 and a lower battery module 130 arranged under the upper battery module 120 are combined as described below.

An upper end plate 140 is disposed at an outermost end of the upper battery module 120. The upper end plate 140 includes an upper base plate 141 and an upper flange unit 142 bent from edges of the upper base plate 141. A lower end plate 150 is disposed at an outermost end of the lower battery module 130. The lower end plate 150 includes a lower base plate 151 and a lower flange unit 152 bent from edges of the lower base plate 151.

The upper and lower end plates 140 and 150 are disposed at the same position in the vertical direction. At least a portion of the upper flange unit 142 bent from a bottom edge of the upper base plate 141 contacts the lower flange unit 152 cut and bent from a top edge of the lower base plate 151.

Here, combination holes formed in the upper and lower flange units 142 and 152 are aligned (e.g., matched to each other) and bolts 143 are inserted into the combination holes so as to be screwed into nuts 144.

As such, the upper and lower end plates 140 and 150 are combined with each other. The upper and lower battery modules 120 and 130 supported by the upper and lower end plates 140 and 150 are fixed (e.g., may not be rearranged) unless the battery module 100 is disassembled. In this manner, the battery modules 100 stacked in the horizontal and vertical directions are firmly fixed to each other.

Although a combination method using fasteners such as the bolts 143 and the nuts 144 is described above, the combination method is not limited to any one combination method as long as the upper end plate 140 is attached to (or combined with) the lower end plate 150. For example, a welding combination method may be used instead of or in addition to using the fasteners.

Furthermore, reinforcement plates 401 for structurally reinforcing and supporting the battery modules 100 are further mounted on the battery modules 100. The reinforcement plates 401 include upper and lower reinforcement plates 402 and 403.

Figure 4:
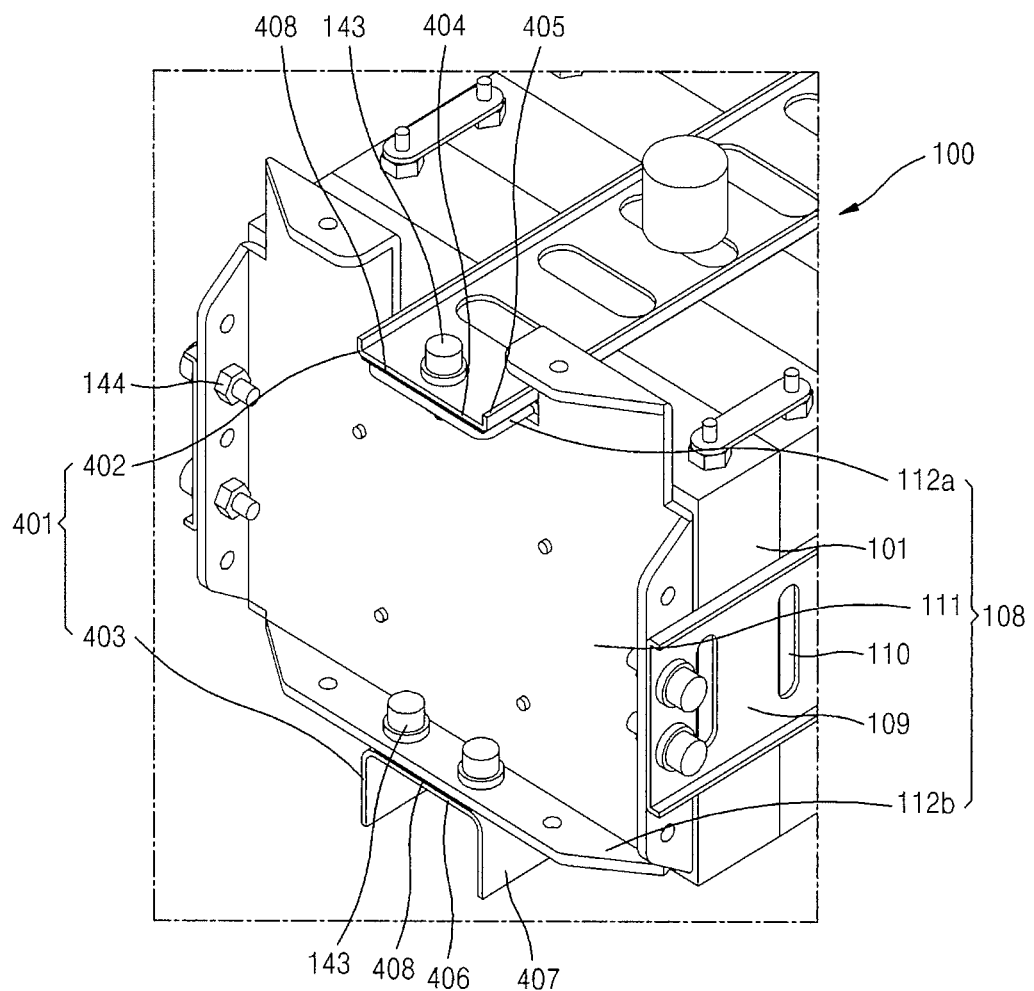
FIG. 4 is a magnified perspective view the end plate illustrated in FIG. 1 when the end plate is mounted, according to an embodiment of the present invention.
Figure 5:
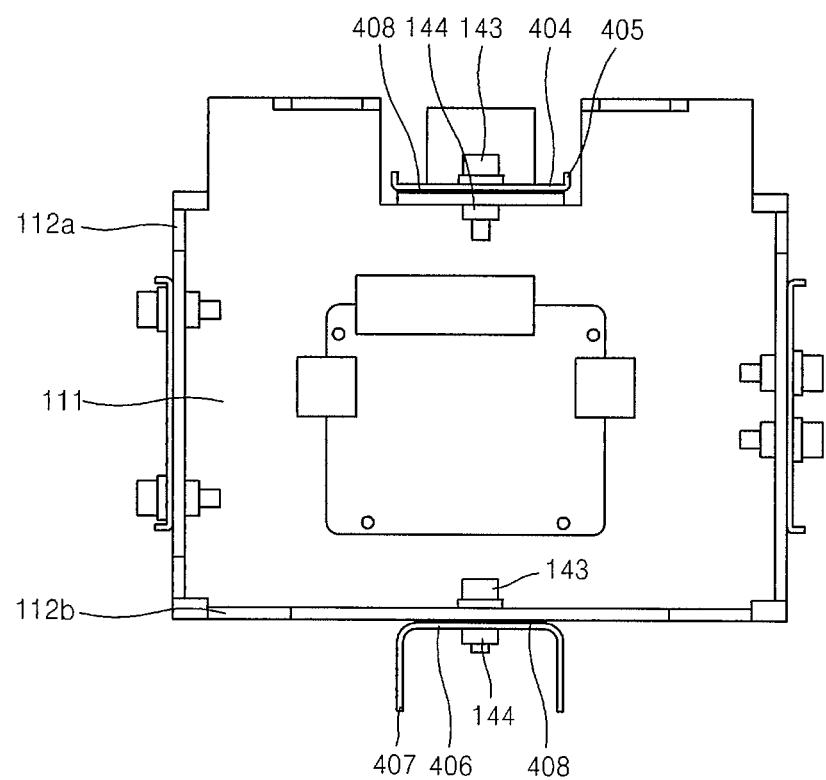
FIG. 5 is a front view of the end plate illustrated in FIG. 1, according to an embodiment of the present invention.

FIG. 4 is a magnified perspective view of one of the end plates 108 illustrated in FIGS. 1 and 3, when the end plate 108 is mounted, according to an embodiment of the present invention. FIG. 5 is a front view of the end plate 108 illustrated in FIGS. 1 and 4, according to an embodiment of the present invention.

Referring to FIGS. 4 and 5, the end plate 108 includes a base plate 111, an upper flange unit 112a bent from a top edge of the base plate 111, and a lower flange unit 112b bent from a bottom edge of the base plate 111. The upper flange unit 112a forms a plurality of bent portions having different heights formed by cutting a portion of the base plate 111, and the lower flange unit 112b forms one bent portion from the base plate 111 without a cut. For example, the upper flange unit 112a has a low portion having a lower height than other portions of the upper flange unit 112a.

An upper reinforcement plate 402 is mounted on a top surface of a battery module 100 and a lower reinforcement plate 403 is mounted on a bottom surface of the battery module 100. The upper reinforcement plate 402 includes an upper base plate 404 located on the top surface of the battery module 100 along a length direction of the battery module 100, and upper bent portions 405 bent upward in a vertical direction from two side edges of the upper base plate 404. The lower reinforcement plate 403 includes a lower base plate 406 located on the bottom surface of the battery module 100 along the length direction of the battery module 100, and lower bent portions 407 bent downward in the vertical direction from two side edges of the lower base plate 406.

An end of the upper base plate 404 is firmly fixed to the upper flange unit 112a at the low portion (e.g., the low portion receives the upper base plate 404) by using fasteners, such as a bolt 143 and a nut 144. Also, an end of the lower base plate 406 is combined with the lower flange unit 112b by using fasteners, such as bolts 143 and nuts 144.

As such, the upper and lower reinforcement plates 402 and 403 prevent (or substantially prevent) the battery module 100 from being deformed downward (or reduce the likelihood the battery module 100 will be deformed downward) due to the weight of a plurality of battery units 101.

Furthermore, insulation plates 408 formed of an insulating material, such as polymer resin, may be further mounted on a bottom surface of the upper base plate 404 facing the top surface of the battery module 100 and/or on a top surface of the lower base plate 406 facing the bottom surface of the battery module 100 in order to prevent (or reduce the likelihood of) shorts caused by a drop of the battery units 101 stacked in the vertical direction. The insulation plates 408 are attached on the upper and lower base plates 404 and 406 along length directions of the upper and lower base plates 404 and 406.

Alternatively, if the upper and lower reinforcement plates 402 and 403 are formed of an insulating material having a desired strength instead of a metallic material, due to their own insulation properties, the insulation plates 408 are not additionally required. The insulation method between the battery units 101 and the upper and lower reinforcement plates 402 and 403 is not limited to any one insulation method as long as the battery units 101 are insulated from the upper and lower reinforcement plates 402 and 403.

Referring back to FIGS. 3 and 6, the lower reinforcement plate 403 mounted on a bottom surface of the upper battery module 120 and the upper reinforcement plate 402 mounted on a top surface of the lower battery module 130 combine with each other so as to form a sealed (or substantially sealed) gas discharge hole 301. As such, when a gas is generated from inside the battery units 101 due to damage to the lower battery module 130, the gas discharge hole 301 may function as a gas passage.

As such, as illustrated in FIG. 6, the battery pack 300 forms an assembly of the battery modules 100 stacked in the horizontal and vertical directions. Neighboring battery modules 100 may be firmly fixed by connecting to each other the first and second end plates 106 and 107 located at outermost sides of the battery modules 100.

As described above, according to the one or more of the above embodiments of the present invention, a battery pack may have one or more features described below.

First, as stacked battery modules are connected to each other by using end plates, the battery modules may be firmly fixed to each other without an additional connection frame.

Second, as the additional connection frame is not required, the weight of a battery pack may be reduced.

Third, the structure of the stacked battery modules may be simplified.

Fourth, as the stacked battery modules have the same connection structure, manufacturing costs may be reduced.

Fifth, as reinforcement plates are mounted between the stacked battery modules, a plurality of battery units may be supported.

Sixth, as the reinforcement plates are mounted, a gas discharge passage may be formed between neighboring battery modules.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
 a first end plate and a second end plate, each of the end plates comprising at least one flange;
 a plurality of battery units arranged along a first direction between the end plates;
 a first guide plate on a first side of the plurality of battery units, extending in the first direction and coupled to respective first flanges of the at least one flange of the first and second end plates;
 a second guide plate on a second side of the plurality of battery units opposite the first side, extending in the first direction and coupled to respective second flanges of the at least one flange of the first and second end plates;
 a first reinforcement plate on a third side of the plurality of battery units, extending in the first direction and coupled to the first and second end plates; and
 a second reinforcement plate on a fourth side of the plurality of battery units opposite the third side, extending in the first direction and coupled to the first and second end plates,
 wherein each of the end plates further comprises a base plate adjacent to and contacting a respective outermost side of the plurality of battery units, and the at least one flange of each of the end plates extends away from the base plate in the first direction or a direction opposite the first direction,
 wherein the at least one flange comprises:
  the first and second flanges extending respectively from first and second sides of the base plate away from the plurality of battery units;
  a third flange extending from a third side of the base plate away from the plurality of battery units; and
  a fourth flange extending from a fourth side of the base plate away from the plurality of battery units, the fourth side being opposite to the third side,
 wherein each of the flanges has at least one opening passing through the flange in a direction substantially perpendicular to the first direction, and
 wherein the first reinforcement plate attaches to the third flange at one or more openings of the at least one opening of the third flange, and the second reinforcement plate attaches to the fourth flange at one or more openings of the at least one opening of the fourth flange.

2. The battery module of claim 1, wherein a distance between the first and second guide plates in a second direction perpendicular to the first direction is greater than or equal to a width in the second direction of the end plates.

3. The battery module of claim 1, wherein the first reinforcement plate comprises a first base plate on the third side of the plurality of battery units and first bent portions on each side of the first base plate extending away from the plurality of battery units, and
 wherein the second reinforcement plate comprises a second base plate on the fourth side of the plurality of battery units and second bent portions on each side of the second base plate extending away from the plurality of battery units.

4. The battery module of claim 1, further comprising a first insulation plate between the first reinforcement plate and the third side of the plurality of battery units; and a second insulation plate between the second reinforcement plate and the fourth side of the plurality of battery units.

5. The battery module of claim 1, wherein the third flange comprises a low portion having a lower height than other portions of the third side of the base plate, and wherein the low portion receives the first reinforcement plate.

6. The battery module of claim 1, wherein the first and second guide plates have openings.

* * * * *